US005336077A

United States Patent [19]

Gerhardt

[11] Patent Number: 5,336,077

[45] Date of Patent: Aug. 9, 1994

[54] ROLLER FOR CONTINUOUS BELT PRESS

[75] Inventor: Klaus Gerhardt, Rheurdt, Fed. Rep. of Germany

[73] Assignee: G. Siempelkamp GmbH & Co., Krefeld, Fed. Rep. of Germany

[21] Appl. No.: 990,840

[22] Filed: Dec. 16, 1992

[30] Foreign Application Priority Data

Dec. 18, 1991 [DE] Fed. Rep. of Germany ....... 4141833

[51] Int. Cl.⁵ ............ B29C 43/00

[52] U.S. Cl. ............ 425/371; 100/151; 100/154; 156/583.5

[58] Field of Search ............ 100/151, 153, 154; 156/555, 583.5; 425/371

[56] References Cited

U.S. PATENT DOCUMENTS

| | | | |
|---|---|---|---|
| 2,137,505 | 11/1938 | Osgood | 100/154 |
| 2,137,506 | 11/1938 | Osgood | 100/154 |
| 3,973,483 | 8/1976 | Appenzeller | 100/154 |
| 4,213,748 | 7/1980 | Ahrweiler | 425/371 |
| 4,417,866 | 11/1983 | Sitzler | 425/364 R |
| 4,480,978 | 11/1984 | Gerhardt | 425/371 |
| 4,494,648 | 1/1985 | Held | 100/154 |
| 4,613,293 | 9/1986 | Gerhardt | 425/371 |
| 4,714,015 | 12/1987 | Stabler | 100/154 |
| 4,807,525 | 2/1989 | de Brock | 425/371 |

FOREIGN PATENT DOCUMENTS

| | | | |
|---|---|---|---|
| 525788 | 6/1956 | Belgium | 100/154 |
| 0236905 | of 0000 | European Pat. Off. | |
| 3534996 | of 0000 | Fed. Rep. of Germany | |
| 2355797 | 5/1975 | Fed. Rep. of Germany | 425/371 |

*Primary Examiner*—Charles S. Bushey

*Attorney, Agent, or Firm*—Herbert Dubno; Andrew Wilford

[57] ABSTRACT

A belt press has a frame having horizontally extending and vertically spaced upper and lower plates defining a horizontally extending gap, respective upper and lower sets of drums rotatable on the frame, respective upper and lower endless belts spanned over the respective upper and lower sets of drums and each having a working stretch lying between the plates, and respective upper and lower sets of tubular rollers engaged between the working stretches and the respective plates. Respective upper and lower sets of rods traverse the respective rollers and are connected together as upper and lower endless chains. A drive connected to the drums advances the belts to move the working stretches horizontally in a transport direction to displace a workpiece in the direction through the gap and the plates are urged together with a pressure of between 300N/cm$^2$ and 600N/cm$^2$. Each tubular roller has a wall thickness greater than 2 mm, is formed of a material such that it is not substantially deformed when compressed diametrally between the respective plate and the respective working stretch, has a mass which is smaller by a factor of between 0.30 and 0.50 than a solid rod of identical material and outside dimensions, and has a geometrical moment of inertia that is smaller by a factor of between 0.50 and 0.65 than a solid rod of identical material and outside dimensions.

5 Claims, 1 Drawing Sheet

ROLLER FOR CONTINUOUS BELT PRESS

FIELD OF THE INVENTION

The present invention relates to a belt press. More particularly this invention concerns such a press whose belts are supported on arrays of rollers and for the rollers used in the press.

BACKGROUND OF THE INVENTION

A standard belt press as described in U.S. Pat. Nos. 4,417,866, 4,480,978, and 4,613,293 has a frame having horizontally extending and vertically spaced upper and lower plates defining a horizontally extending gap having an upstream end and a downstream end, vertically spaced upper and lower upstream drums rotatable about respective horizontal axes at the upstream end, vertically spaced upper and lower downstream drums rotatable about respective horizontal axes at the downstream end, and upper and lower endless belts spanned over the respective upper and lower drums and each having a working stretch lying between the plates and a return stretch. Upper and lower sets of rollers engaged between the working stretches and the respective plates can be recirculated as the belts are advanced to move the working stretches horizontally in a transport direction to displace a workpiece in the direction through the gap so that the working stretches are supported on the respective plates by these rollers. The entire press is also normally heated to activate a binder in the workpiece.

Typically the rollers have a diameter of between 15 mm and 25 mm, normally 20 mm, and are subjected to a pressure between 300N/cm$^2$ and 600N/cm$^2$ normally 500N/cm$^2$. As a result the standard prior-art practice has been to use solid rods as the rollers. Such solid rods can be made to very tight tolerances of diameter, straightness, and the like. Nonetheless in a long press, which can exceed 50 m in length, this means that a huge mass of such rollers must be moved.

It has been suggested in German patent 3,534,996 filed Oct. 01, 1985 and in European patent 236,905 issued Apr. 03, 1991 and equivalent U.S. Pat. No. 4,807,525 to R. deBrock (based on DE 3,608,487 filed Mar. 14, 1986) to make the rollers tubular. These rollers are of extremely thin wall thickness, well under 2 mm, so that they deform in the press and act as spring elements. The service life of such rollers, which deform substantially in use, is therefore relatively short.

OBJECTS OF THE INVENTION

It is therefore an object of the present invention to provide an improved roller for a belt press.

Another object is the provision of such an improved roller for a belt press which overcomes the above-given disadvantages, that is which ensures highly efficient press operation without in any way making the press less effective than a press using solid rollers.

SUMMARY OF THE INVENTION

The instant invention is used in a belt press having a frame having horizontally extending and vertically spaced upper and lower plates defining a horizontally extending gap, respective upper and lower sets of drums rotatable on the frame, respective upper and lower endless belts spanned over the respective upper and lower sets of drums and each having a working stretch lying between the plates, and respective upper and lower sets of tubular rollers engaged between the working stretches and the respective plates. Respective upper and lower sets of rods traverse the respective rollers and are connected together as upper and lower endless chains. A drive connected to the drums advances the belts to move the working stretches horizontally in a transport direction to displace a workpiece in the direction through the gap and the plates are urged together with a pressure of between 300N/cm$^2$ and 600N/cm$^2$. According to the invention each tubular roller has a wall thickness greater than 2 mm, is formed of a material such that it is not substantially deformed when compressed diametrally between the respective plate and the respective working stretch, has a mass which is smaller by a factor of between 0.30 and 0.50 than a solid rod of identical material and outside dimensions, and has a geometrical moment of inertia that is smaller by a factor of between 0.50 and 0.65 than a solid rod of identical material and outside dimensions.

More particularly according to the invention the mass of each tubular roller is smaller by a factor of about 0.40 than a solid rod of identical material and outside dimensions. In addition the geometrical moment of inertia of each tubular roller is smaller by a factor of about 0.60 than a solid rod of identical material and outside dimensions. The rollers are cylindrical and each have an outside diameter of about 18 mm and an inside diameter of about 14 mm. Furthermore the drive advances the belts at a speed of at least 250 mm/sec and the working stretches have a length of at least 50 m.

The relatively thick-walled tubular rollers according to this invention have proven themselves to be a huge improvement on the thinner-walled tubular rollers of the prior art. There is very little spring effect or compression of the inventive tubular rollers in the press. These tubes fit with quite some play on the respective chain rods and reduce the hertz tensions by a factor of about 0.994. Surprisingly this positively affects the rolling friction by greatly reducing it.

With the system of this invention the overall mass of the rollers is substantially reduced, thereby generally reducing the mass that the various drives and roller-recirculating systems must deal with and making it possible for the press to operate more rapidly. Even in the return stretch, when the rollers are being moved outside the press gap from the downstream end of the press to its upstream end, the droop or bending deformation of these tubes is reduced by about 63%, making inserting them into the upstream working-stretch end easier.

In addition it has surprisingly been found that heat transfer from the heated press platens through the rollers to the stainless-steel belts and thence to the workpiece is not deleteriously affected by the fact that the rollers are tubular instead of being solid. In fact the reduced heat capacity of these rollers decreases by about half the amount of heat the system needs to run. Evidently the relatively thick walls of the tubes allow the heat transfer to be as good as for solid-core rollers, and the fact that the rollers have no cores that must be heated means that the system can be up to temperature faster than a prior-art one.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
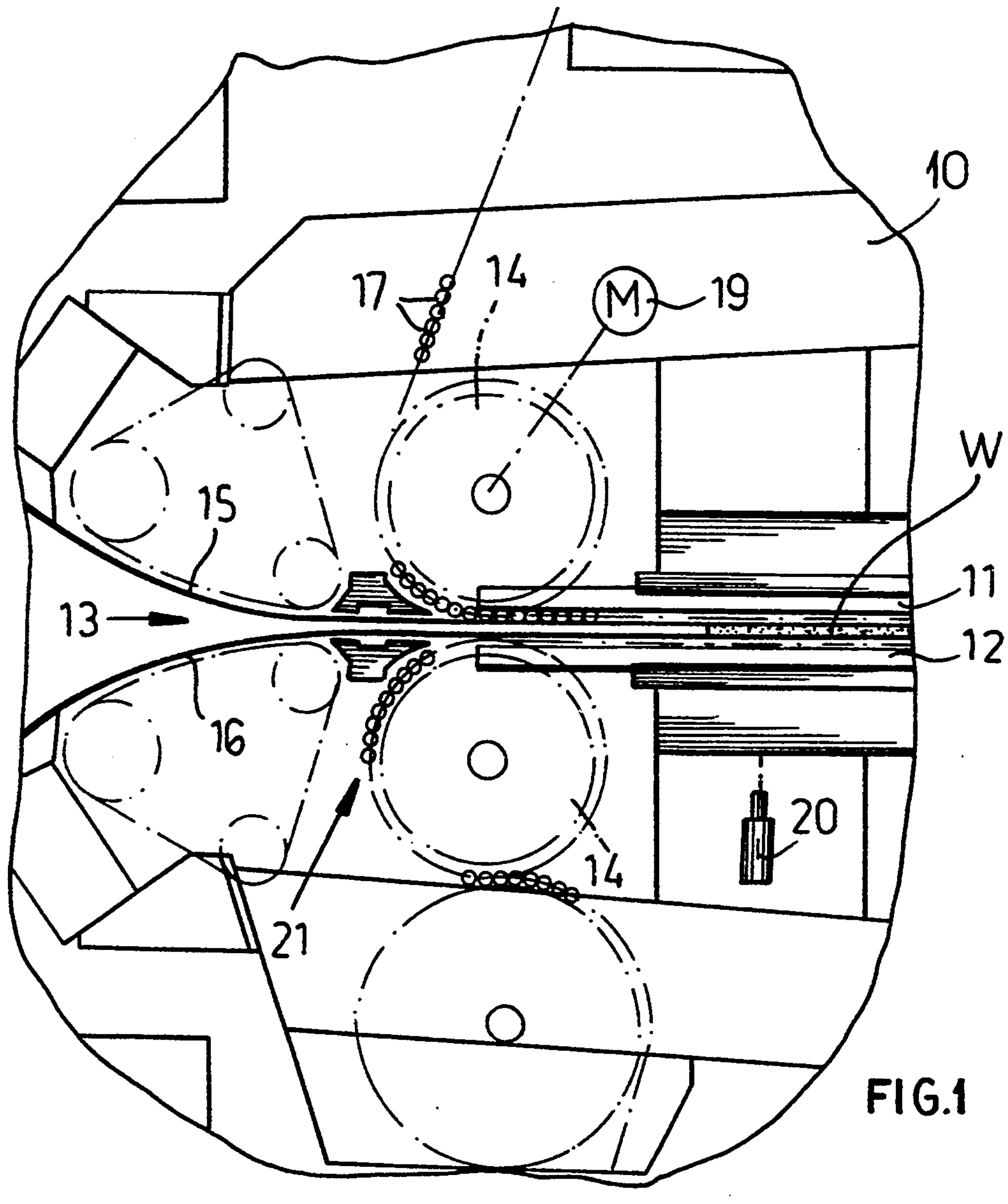
FIG. 1 is a vertical section through the upstream end of a belt press according to the invention.

As seen in FIG. 1 a belt press has a frame 10 having horizontally extending and vertically spaced upper and lower plates 11 and 12 defining a horizontally extending gap 13. Respective upper and lower sets of drums 14 rotatable on the frame 10 carry respective upper and lower endless belts 15 and 16 spanned over the respective upper and lower sets of drums 14 and each having a working stretch lying between the plates 11 and 12.

Respective upper and lower sets of tubular rollers 17 engaged between the working stretches and the respective plates 11 and 12 are carried on respective upper and lower sets of rods 18 (See FIG. 2. ) traversing the respective rollers 17 and connected together as upper and lower endless chains. A drive motor 19 connected to the drums 14 advances the belts 11 and 12 to move the working stretches horizontally in a transport direction to displace a workpiece W through the gap 13. The plates are urged together by an actuator 20 with a pressure of between $300N/cm^2$ and $600N/cm^2$.

Figure 2:
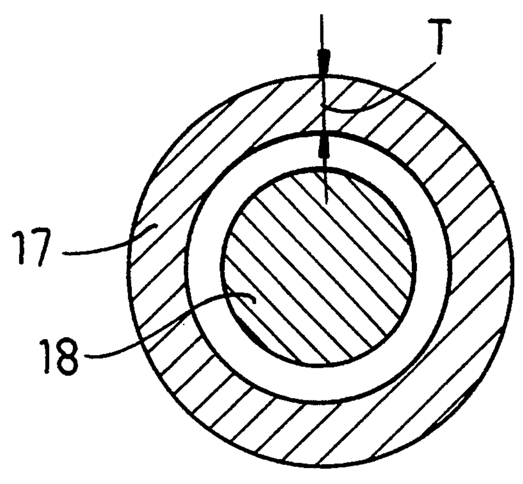
FIG. 2 is a large-scale cross section through one of the rollers of the press.

As best seen in FIG. 2 each tubular roller 17 has a wall thickness T of slightly more than 2 mm and an outside diameter of about 18 mm. In addition each tube 17 is formed of a material such as steel so that it is not substantially deformed when compressed diametrally between the respective plate and the respective working stretch and has a mass which is smaller by a factor of between 0.30 and 0.50 than a solid rod of identical material and outside dimensions. Furthermore each tube 17 has a geometrical moment of inertia that is smaller by a factor of between 0.50 and 0.65 than a solid rod of identical material and outside dimensions.

We claim:

1. In a belt press having a frame having horizontally extending and vertically spaced upper and lower plates defining a horizontally extending gap;

respective upper and lower sets of drums rotatable on the frame;

respective upper and lower endless belts spanned over the respective upper and lower sets of drums and each having a working stretch lying between the plates;

respective upper and lower sets of tubular rollers engaged between the working stretches and the respective plates;

respective upper and lower sets of rods traversing the respective rollers and connected together as upper and lower endless chains;

drive means connected to the drum for advancing the belts to move the working stretches horizontally in a transport direction to displace a workpiece in the direction through the gap; and means for urging the plates together with a pressure of between $300N/cm^2$ and $600N/cm^2$, the improvement wherein each tubular roller has a wall thickness of more than 2 mm, is formed of a material such that it is not substantially deformed when compressed diametrally between the respective plate and the respective working stretch;

has a mass which is smaller by a factor of between 0.30 and 0.50 than a solid rod of identical material and outside dimensions; and has a geometrical moment of inertia that is smaller by a factor of between 0.50 and 0.65 than a solid rod of identical material and outside dimensions.

2. The belt press defined in claim 1 wherein the mass of each tubular roller is smaller by a factor of about 0.40 than a solid rod of identical material and outside dimensions.

3. The belt press defined in claim 1 wherein the geometrical moment of inertia of each tubular roller is smaller by a factor of about 0.60 than a solid rod of identical material and outside dimensions.

4. The belt press defined in claim 1 wherein the rollers are cylindrical and each have an outside diameter of about 18 mm and an inside diameter of about 14 mm.

5. The belt press defined in claim 1 wherein the working stretches have a length of at least 50 m.

* * * * *